Figure 1:
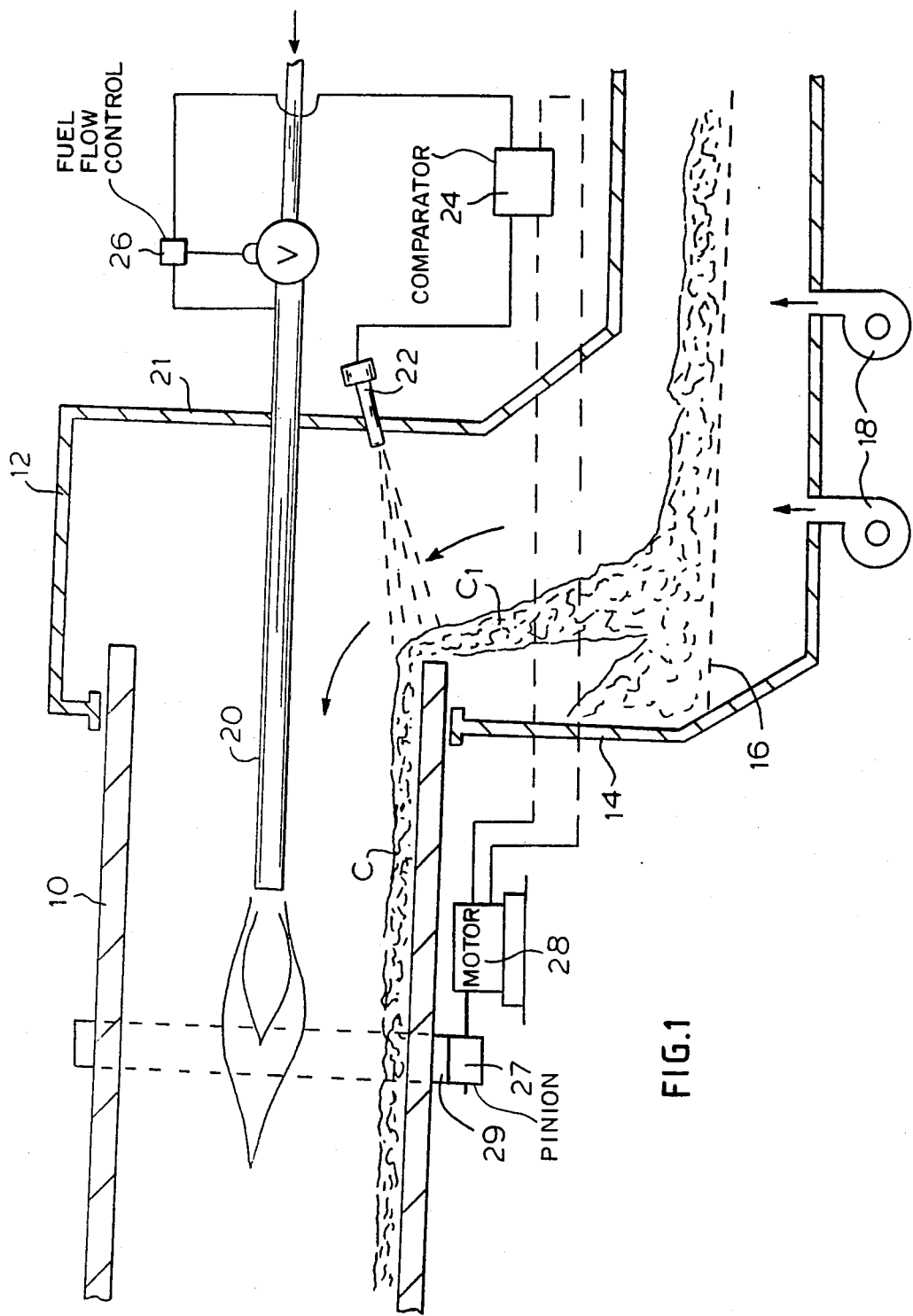

United States Patent [19]

Benoit et al.

[11] Patent Number: 4,716,532
[45] Date of Patent: Dec. 29, 1987

[54] CLINKER MANUFACTURE CONTROL USING FALLING CLINKER COLORIFIC ENERGY MEASUREMENT

[75] Inventors: Philippe Benoit, Lambersart; Alain Chielens, Mouvaux; Jean-Paul Voisin, Helemmes, all of France

[73] Assignee: Fives-Cail Babcock, Paris, France

[21] Appl. No.: 838,146

[22] Filed: Mar. 10, 1986

[30] Foreign Application Priority Data

Mar. 13, 1985 [FR] France ............................. 85 03660

[51] Int. Cl.⁴ .................... F27B 7/42; C04B 7/44; G01J 5/52
[52] U.S. Cl. ..................................... 364/477; 432/17; 432/45
[58] Field of Search ............... 364/477; 432/17, 37, 432/42, 45, 47, 48; 110/186, 188, 190, 246, 257

[56] References Cited

U.S. PATENT DOCUMENTS

| | | | |
|---|---|---|---|
| 3,437,325 | 4/1969 | Putnam et al. | 432/17 |
| 3,483,363 | 12/1969 | Ross | 432/45 |
| 3,566,091 | 2/1971 | Lansdale et al. | 432/45 |
| 3,595,544 | 7/1971 | Curtis et al. | 432/45 |
| 3,888,621 | 6/1975 | Williams | 432/45 |
| 4,022,569 | 5/1977 | Farago et al. | 432/17 |

Primary Examiner—Jerry Smith
Assistant Examiner—Allen MacDonald
Attorney, Agent, or Firm—Kurt Kelman

[57] ABSTRACT

To optimize the operation of an installation for the manufacture of clinker, which installation comprises a rotary tubular kiln having an open discharge end for the clinker produced in the kiln, a cooler for the clinker connected to the discharge end, a hood covering the open discharge end and the cooler, hot clinker falling from the open discharge end into the cooler in a downward direction and cooling air passing in the cooler through the hot clinker and heated by the hot clinker, and a burner mounted in the hood and extending into the open discharge end of the rotary tubular kiln, the calorific energy radiated by the falling hot clinker is measured across the atmosphere of the hood to establish a control value, the measured control value is compared with a predetermined reference value for the radiated calorific energy, and at least one operating parameter of the installation is controlled in response to the difference between the control and reference values.

3 Claims, 2 Drawing Figures

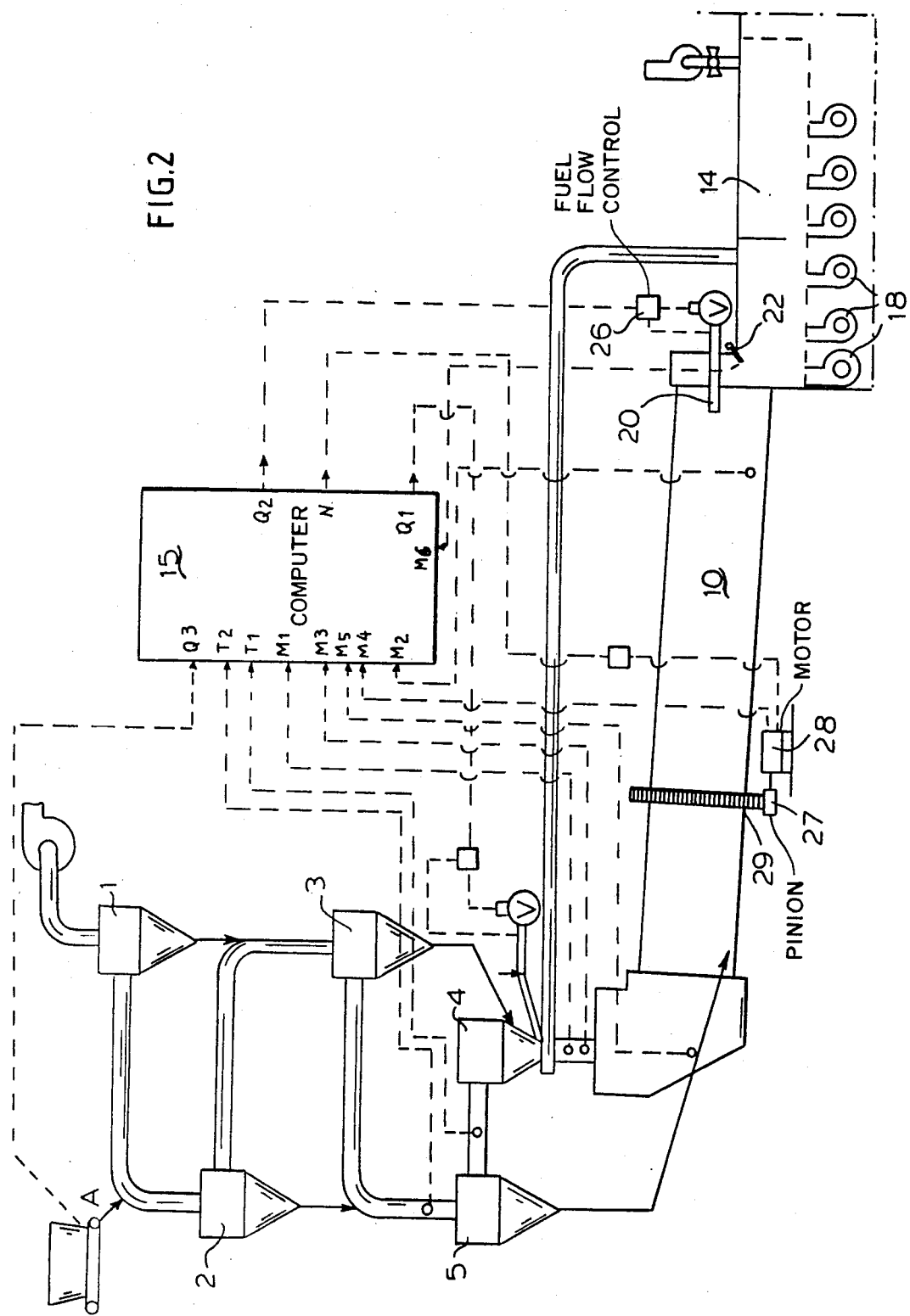

CLINKER MANUFACTURE CONTROL USING FALLING CLINKER COLORIFIC ENERGY MEASUREMENT

The present invention relates to a method of operating an installation for the manufacture of clinker, which installation comprises a rotary tubular kiln having an open discharge end for the clinker produced in the kiln, a cooler for the clinker connected to the discharge end, a hood covering the open discharge end and the cooler, the hood enclosing an atmosphere, hot clinker falling from the open discharge end into the cooler in a downward direction and cooling air passing in the cooler through the hot clinker and heated by the hot clinker, the heated cooling air flowing through the atmosphere of the hood towards the open discharge end countercurrently to the falling hot clinker, and a burner mounted in the hood and extending into the open discharge end of the rotary tubular kiln.

In such installations, such operating parameters as the throughput of raw material, the speed of rotation of the tubular kiln in which the calcined raw material is burned to produce the clinker, the feed rate of fuel to the burner heating the kiln, etc., are controlled so that a clinker of the desired quality and of as uniform a quality as possible is obtained. This control may be effected manually or automatically in response to predetermined reference values for selected operating parameters.

More particularly, it is desirable to maintain the content of free lime in the clinker within narrow limits. Unfortunately, it is not easy to measure this continuously and in a dependably accurate manner on the basis of the hot clinker leaving the discharge end of the rotary tubular kiln. Generally, it has been determined on the basis of an analysis of the clinker coming from the cooler. Taking into account the dwell time of the clinker in the cooler and the time the analysis takes, the results of the analysis cannot be used for the control of the operation of the kiln, however, because changes in the operation are divulged by the analysis only at the end of a relatively long time after they have occurred and can only then be used for correcting undesirable operational changes.

U.S. Pat. No. 3,483,363 discloses a method of controlling the operation of an installation for the manufacture of clinker in response to the temperature measured in the interior of the kiln where the material is converted into clinker. The measured temperature variations reflect the content of free lime in the clinker. However, the measurements of the clinker temperature in the zone where the cement material is burned cannot be made precisely because they are frequently perturbed by heat radiated from the burner and by dust particles suspended in the air coming from the cooler into the interior of the kiln. Also, the most precise types of temperature gages, such as optical pyrometers, cannot be used for measuring the temperature in the interior of the kiln. Therefore, the measurements are imprecise and an optimal control of the operation is not possible on the basis of such a temperature measurement.

It is the primary object of this invention to optimize the operating control of an installation for the manufacture of clinker. The invention is based on the discovery that measuring the calorific energy radiated by the falling hot clinker by a suitable device placed in the wall of the hood facing the open discharge end of the kiln gives an excellent indication of the content of free lime in the clinker under all operating conditions.

Accordingly, the present invention comprises the steps of measuring the calorific energy radiated by the falling hot clinker across the atmosphere of the hood to establish a measured value, comparing the measured control value with a predetermined reference value for said radiated calorific energy, and controlling at least one operating parameter of said installation in response to the difference between the control and reference values.

This improved operating method is carried out in an installation of the above-indicated type, which comprises a device for measuring the calorific energy radiated by the falling hot clinker across the atmosphere of the hood to establish a value, the measuring device being mounted in the hood wall below the burner and arranged to receive the radiated calorific energy from an upper part of the stream of falling clinker, means for comparing the measured value with a predetermined reference value for said radiated calorific energy, and means for controlling at least one operating parameter of said installation in response to the difference between the control and reference values.

In the method and installation of this invention, it is not the temperature of the clinker which is measured and which is maintained at a constant level but the calorific energy radiated by the falling hot clinker across the atmosphere of the hood is measured and is maintained equal to a predetermined reference value by controlling the operating parameters. Commercially available pyrometers useful for such measurements are designed to emit an electrical control signal in response to, and indicating, the value of the radiated calorific energy received by the pyrometer. The relation of the output signal of the pyrometer to the temperature of the source of the radiated calorific energy depends on the nature of this source and the conditions of the propagation of the radiation between the source and the pyrometer. This relation is determined by a calibration of the pyrometer and is valid only if the measurement is made under the same conditions for which the calibration has been made. As long as made under these conditions, measuring errors will be avoided because the electrical control signal emitted by the pyrometer is not sensitive to outside disturbances and always accurately and dependably represents the energy received by the target of the pyrometer exposed to the radiated energy. The variations in the radiated energy received by a pyrometer placed in the wall of the hood facing the open discharge end of the kiln are representative of the variations in the dust content of the air circulating through the hood and, consequently, of the content of free lime in the clinker.

The above and other objects, advantages and features of the invention will become more apparent from the following detailed description of certain now preferred embodiments thereof, taken in conjunction with the accompanying somewhat schematic drawing wherein FIG. 1 shows a cross sectional view of the discharge end of a rotary tubular kiln in an installation for the manufacture of clinker, and FIG. 2 is a diagrammatic view of such an installation.

Referring now to the drawing, the illustrated installation is generally conventional and comprises rotary tubular kiln 10 having an open discharge end for clinker C produced in the kiln. Cooler 14 for the clinker is connected to the discharge end and hood 12 covers the open discharge end and the cooler. Hood 12 has wall 21 facing the open discharge end of kiln 10 and encloses an atmosphere. Hot clinker falls in stream $C_1$ from the open discharge end into cooler 14 in a downward direction. In the illustrated embodiment, grid 16 in cooler 14 receives the falling stream of hot clinker and a source of cooling air represented by a bank of blowers 18 passes the cooling air through the grid and the hot clinker. The cooling air is heated by the hot clinker as it passes therethrough and the heated cooling air flows through the atmosphere of the hood towards the open discharge end countercurrently to the falling hot clinker. Burner 20 is mounted in hood wall 21 and extends into the open discharge end of rotary tubular kiln 10 to provide the heat which converts the cement material in the kiln into clinker.

Schematically shown grid 16 may be shaken and/or subjected to other movements to assure displacement of the bed of clinker from one end of the cooler adjacent the open discharge end of the kiln to an output end of the cooler (not shown) from which the cooled clinker is discharged. During the displacement of the clinker, it is cooled by the air blown therefrom blowers 18. If desired and as is known, after passing through the hot clinker, the heated cooling air may be at least partially utilized as secondary air in the kiln for diluting the gases produced by burner 20.

Such operating parameters as the throughput of raw material, the speed of rotation of the tubular kiln in which the calcined raw material is burned to produce the clinker, the feed rate of fuel to the burner heating the kiln, etc., are controlled so that a clinker of the desired quality and of as uniform a quality as possible is obtained according to the standards set by the manufacturer. This control is effected according to this invention with device 22 for measuring the calorific energy radiated by falling clinker $C_1$ across the atmosphere of the hood to establish a control value. The measuring device may be, for example, an optical pyrometer or an infrared camera. Measuring device 22 is mounted in hood wall 21 below burner 20 and is arranged to receive the radiated calorific energy from an upper part of stream $C_1$ of falling clinker. Means 24 for comparing the measured value with a predetermined reference value for the radiated calorific energy and for controlling at least one operating parameter of the installation in response to the difference between the control and reference values has an input connected to the output of measuring device 22 for receiving a control signal indicating the measured value from the measuring device and a respective output transmitting a control signal indicating the difference between the measured value and a reference value programmed in means 24 to a respective control for one of the operating parameters.

Any fluctuation in the rate of transmission of the radiated calorific energy from stream $C_1$ of falling clinker through the atmosphere in the hood, which is due to the content of dust in the air coming from the cooler and passing through the hood, will change the value measured by device 22. As is known, this dust content in the cooling air flow depends on the unburned percentage of the clinker, i.e. the content of free lime in the clinker. Therefore, the value measured by device 22 will reflect the content of free lime in the clinker. This value does not represent the temperature of the clinker.

In the example of an installation according to FIG. 1, the value derived from the measurement by device 22 is used to control two operating values, i.e. the fuel flow to burner 20 and the rotary speed of kiln 10 controlled by motor 28.

As shown, one output of control means 24, in which the measured value derived from the output signal of device 22 is compared with a reference value stored in control means 24 and a signal indicating any difference between the measured and reference values is fed to the output, is connected to control 26 which regulates the flow of fuel to burner 20. If the comparison in control means 24 detects such a difference between the measured and reference values, the resultant output signal will correspondingly modify the reference value for fuel flow regulator 26. Another output of control means 24 is connected to motor 28 to modify its rotary speed in response to the output signal. The shaft of motor 28 is keyed to pinion 27 which meshes with ring gear 29 affixed to tubular kiln 10 for rotation thereof. In this manner, the rotary speed of the kiln is controlled by the output signal derived from the radiated calorific energy received by measuring device 22.

FIG. 2 diagrammatically illustrates a generally conventional clinker manufacturing installation in which a pulverulent raw material is fed at A into a heat exchange cyclone system 1 to 5 where the raw material is preheated and precalcined before being delivered into rotary tubular kiln 10. A variety of such systems are well known and, forming no part of the present invention, require no further description. Various operating parameters of the installation may be controlled by the method of this invention to correct in a feed back mode and in real time the reference values of such operating parameters as flow rate values $Q_2$ of the fuel fed to burner 20, rotary speed values N of kiln 10, flow rate values $Q_3$ of the pulverulent raw material, etc., calculated in forward feed by a mathematical model of operation programmed by computer 15. The broken lines in FIG. 2 schematically show the control circuit for this operation. $T_1$ and $T_2$ respectively designate the temperatures of the gas exhausted from precalcination chamber 4 and final heat exchange cyclone 5 whence the preheated raw material is delivered into the input end of kiln 10. $M_1$ is the value indicating the concentration of nitrogen oxides in the exhaust gases from the kiln. $M_2$ designates the temperature in the interior of the kiln in the zone where the raw material is converted into clinker. $M_3$ designates the temperature of the exhaust gases from the kiln. $M_4$ is the value of the torque or rotary speed of entrainment motor 28. $M_5$ indicates the quantity of potassium oxide contained in the raw material in the gas exhaust casing of the kiln. $M_6$ is the value of the amount of radiated calorific energy measured by device 22 and $Q_1$ designates the flow rate of the fuel delivered to precalcination chamber 4. On the basis of inputs $Q_3$, $T_2$, $T_1$, $M_1$, $M_3$, $M_5$, $M_4$, $M_2$ and $M_6$, computer 15 calculates the reference values for $Q_1$, N and $Q_2$ and corrects them in response to the difference between the measured and reference values of $M_6$ to generate output control signals $Q_1$, N and $Q_2$.

This method has the great advantage over conventional methods based on an a posteriori analysis of the amount of free lime in the clinker that it permits instantaneous taking into account of the evolution of the amount of free lime in the clinker, and even to effectuate a correction anticipated by analyzing evolving tendencies in the operation of the installation. In contrast to the conventional method of directly measuring the temperature in the zone where the raw material is converted into clinker in the interior of the kiln, the present method utilizes the disturbance of the calorific energy radiation emitted by the clinker at the discharge end of the kiln, which is due to rising dust in the atmosphere of the hood, to detect a corresponding change in the quality of the clinker and to derive therefrom a control signal for a selected operating parameter.

What is claimed is:

1. In a method of operating an installation for the manufacture of clinker, which installation comprises a rotary tubular kiln having an open discharge end for the clinker produced inthe kiln, a cooler for the clinker connected to the discharge end, a hood covering the open discharge end and the cooler, the hood enclosing an atmosphere, hot clinker falling from the open discharge end into the cooler in a downward direction and cooling air passing in the cooler through the hot clinker and heated by the hot clinker, the heated cooling air flowing through the atmosphere of the hood towards the open discharge end countercurrently to the falling hot clinker, and a burner mounted in the hood and extending into the open discharge end of the rotary tubular kiln, the improvement comprising the steps of measuring the calorific energy radiated by the falling hot clinker across the atmosphere of the hood to establish a measured value, comparing the measured value with a predetermined reference value for said radiated calorific energy, and controlling at least one operating parameter of said installation in response to the difference between the measured and reference values to maintain the content of free lime in the clinker within predetermined limits.

2. In the operating method of claim 1, comprising the further steps of calculating a reference value for said one operating parameter by means of a mathematical model, correcting the calculated reference value in response to the difference between the measured and reference values of said radiated calorific energy, and controlling said one operating parameter so as to maintain the latter at the calculated reference value.

3. In an installation for the manufacture of clinker, which comprises a rotary tubular kiln having an open discharge end for the clinker produced in the kiln, a cooler for the clinker connected to the discharge end, a hood covering the open discharge end and the cooler, the hood having a wall facing the open discharge end of the kiln and enclosing an atmosphere, hot clinker falling in a stream from the open discharge end into the cooler in a downward direction, a source of cooling air, the cooling air passing in the cooler through the hot clinker and being heated by the hot clinker, the heated cooling air flowing through the atmosphere of the hood towards the open discharge end countercurrently to the falling hot clinker, and a burner mounted in the hood wall and extending into the open discharge end of the rotary tubular kiln, the improvement comprising a device for measuring the calorific energy radiated by the falling hot clinker across the atmosphere of the hood to establish a measured value, the measuring device being mounted in the hood wall below the burner and arranged to receive the radiated calorific energy from an upper part of the stream of falling clinker, means for comparing the measured value with a predetermined reference value for said radiated calorific energy, and means for controlling at least one operating parameter of said installation in response to the difference between the measured and reference values.

* * * * *